UNITED STATES PATENT OFFICE.

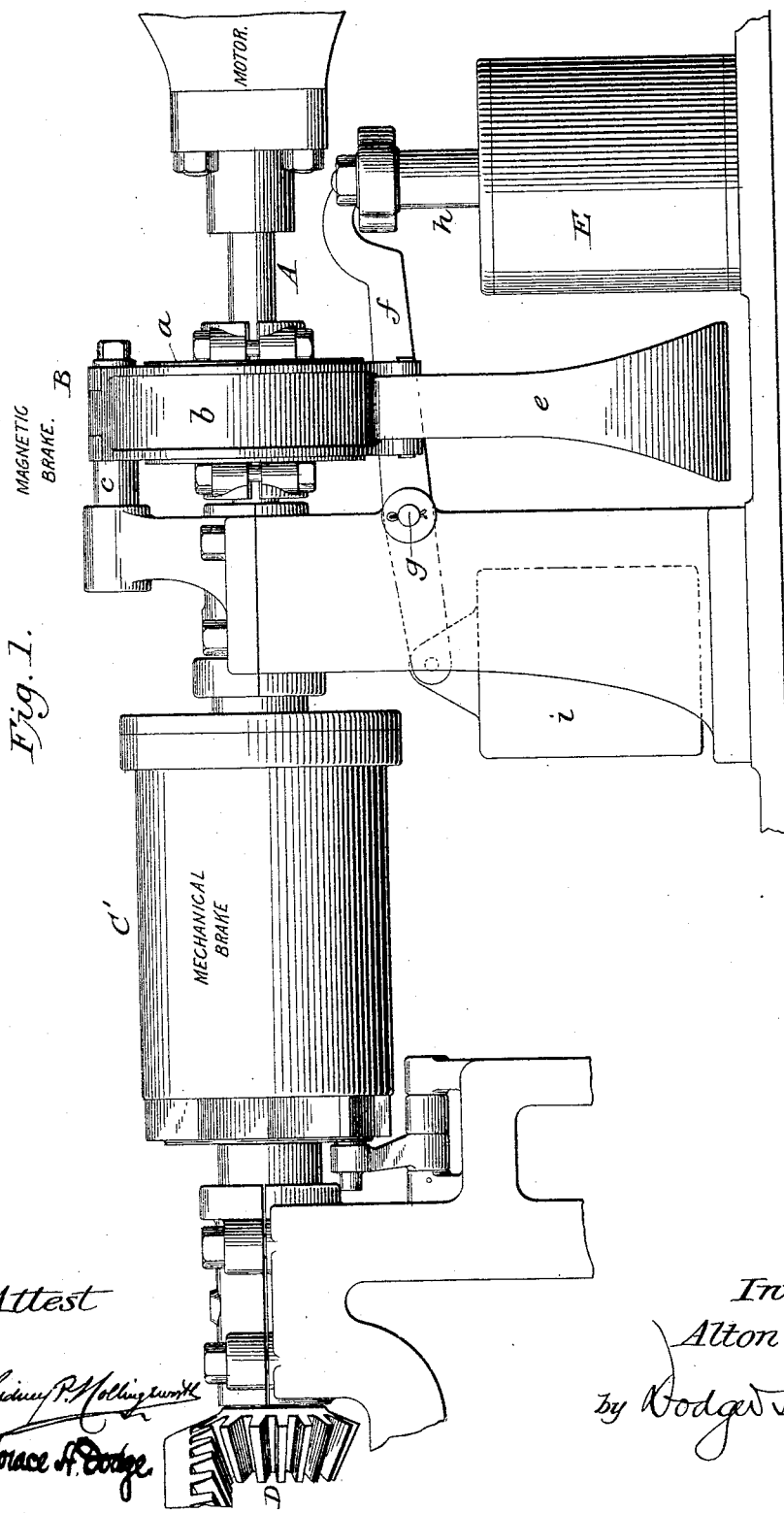

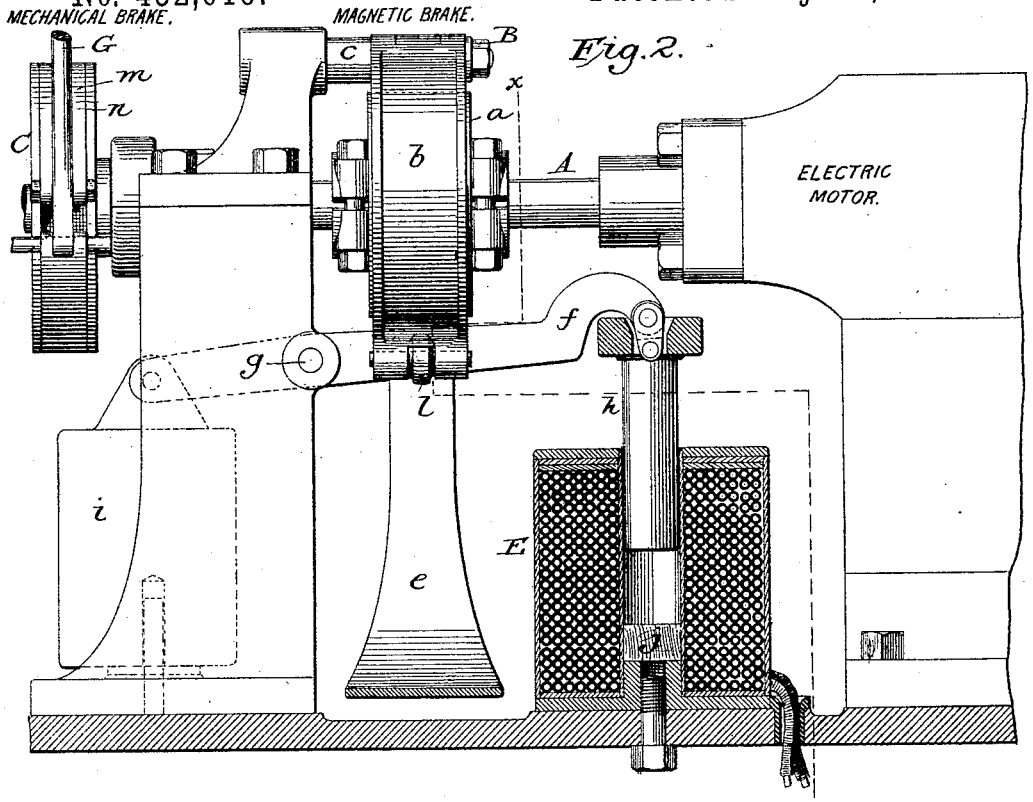
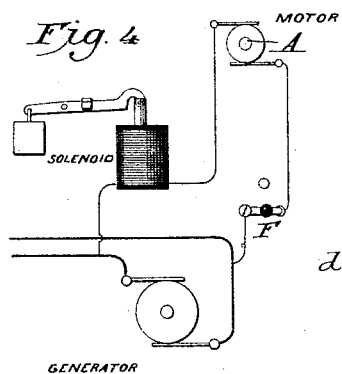
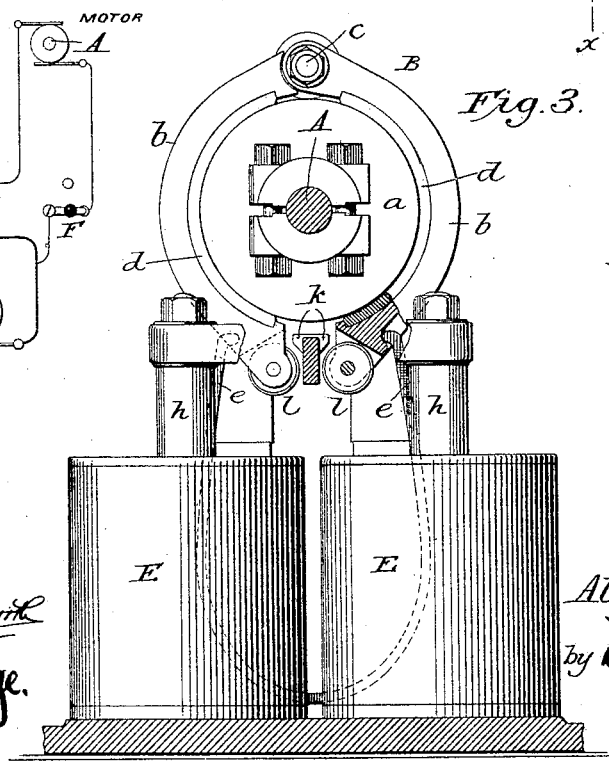

ALTON J. SHAW, OF MILWAUKEE, WISCONSIN.

HOISTING MACHINERY.

SPECIFICATION forming part of Letters Patent No. 452,619, dated May 19, 1891.

Application filed August 23, 1890. Serial No. 362,846. (No model.)

*To all whom it may concern:*

Be it known that I, ALTON J. SHAW, a citizen of the United States, residing at Milwaukee, in the county of Milwaukee and State of Wisconsin, have invented certain new and useful Improvements in Hoisting Machinery, &c., of which the following is a specification.

My invention relates to hoisting machinery and like apparatus in which there is a tendency on the part of the load to turn the motor backward, and more particularly to such machinery as is propelled by electromotive-power.

The invention consists, primarily, in combining with such machinery two brakes, one to be operated and controlled either mechanically or manually and the other controlled electrically, the mechanical or manual brake serving to control the lowering of the load and the electric brake permitting and enabling the operator to stop and start the apparatus promptly without reversing the motor, as will be more fully explained in the following description.

Owing to the high velocity and great momentum of the armatures of electric motors, it is impossible to stop and start them promptly without reversing the motor each time it is desired to do so, unless some special provision be made for bringing the armature promptly to a standstill. It is to attain this end that the electrical brake is provided, and it is so constructed and introduced into the circuit which supplies the motor as that an interruption of the motor-current shall cause the immediate application of the electric brake. The mechanical brake is provided for the reason that without it and with only the magnetic brake all control over the load in lowering would be lost and the motor would "race" until the counter electromotive force would drop the current to so small an amount that it would not sustain or properly energize the solenoid which holds the magnetic brake off or out of action. Under such conditions the magnetic brake would drop or be applied suddenly and bring the moving parts to rest abruptly and with undesirable shock. The current would then increase, withdraw the magnetic brake, and permit the load to begin its descent, whereupon the same action would be repeated, and so on until the full descent should be made. These difficulties are overcome by my combination.

Having thus stated the purpose or the design of the combination, I will proceed to explain the form in which I have applied it, and which I deem peculiarly suitable for hoisting machinery; but I desire it to be understood that my invention is not restricted to the precise form of mechanism shown and described, nor, in fact, to any specific form.

Figure 1 is a side elevation of the compound brake apparatus; Fig. 2, a similar view, partly in section, but representing a manually-controllable brake instead of the automatic brake indicated in Fig. 1; Fig. 3, a cross-section on the line $x\ x$ of Fig. 2; Fig. 4, a diagram illustrating the arrangement of the circuit.

As stated, one of the brakes is designed to be controlled mechanically, in which case its action will be automatic, or manually, requiring the attention and care of an operator. While I prefer and ordinarily use such automatic mechanical brake, I have not illustrated its details herein, and shall at this time give no description of its construction further than to say that an expansible and contractible coil or spring is made use of, which produces friction proportionate to the tendency of the load to descend and to the rate at which the motor turns backward.

Any friction by which the descent of the load can be effectively controlled will answer the purpose of this part of my invention, and the manually-controllable brake being the simplest in construction will best serve in the explanation as a type of mechanical brake.

In the drawings, A indicates the spindle or arbor of the armature of an electric motor; B, a magnetic or electrically-controlled brake; C, a manual or mechanical brake, (lettered C' in Fig. 1, which indicates the automatic mechanical brake,) and D gearing designed to indicate hoisting apparatus of any kind or means for connecting the motor and brake apparatus with such mechanism.

It will of course be understood that the representation of gearing is simply by way of illustration and that gearing will not of necessity be employed.

In the practical employment of electric motors the armature rotates at a high speed, and it is customary to interpose gearing of some kind between the motor and the driving machinery to reduce the speed and give the requisite power. Owing to the exceedingly high velocity of the armature it is liable to continue in motion for some little time after the current is broken by which the motor is supplied, and such overrunning is in many cases a serious obstacle to the use of such machinery. To obviate this difficulty, I provide the magnetic brake B, the details of which are illustrated in Figs. 1, 2, and 3. In these figures, A indicates the spindle or arbor of the motor, as before mentioned, and $a$ a hub or disk secured thereon and turned concentric with the spindle or arbor. $b\ b$ indicate two semicircular arms or levers suspended from a pin $c$ at their upper ends, which project from the main frame-work of the apparatus or from any other suitable support. The disk $a$ is made of any suitable material, as cast-iron or vulcanized fiber, and the arms $b$ are provided with facings or linings $d$ of a material suitable to be used in connection with the material of which the disk $a$ is made, these matters being subject to the judgment of the constructor and to the size of the parts or nature of the use to which the machinery is to be applied and like considerations. The lower ends of the two curved arms $b\ b$ are pressed and held toward each other by a strong U-shaped spring $e$, the ends of which are seated in notches or recesses in the arms, as shown in the sectionalized portion of Fig. 3. When free to act this spring serves to move the arms $b$ toward each other and to force the facings or linings $d$ promptly into contact with the periphery of the disk $a$, and thereby to produce a degree of friction sufficient to prevent the rotation of the arbor or spindle A, and consequently sufficient to prevent the operation of the motor. The power of the spring will of course be proportionate to the dimensions of the co-operating parts and to the power of the motor, but should be in any case sufficient to promptly stop the rotation of the armature and bring the parts to rest instantaneously, or practically so.

To control the action of the brake B, I employ the solenoids E, the cores $h$ of which are suspended from the end of a lever $f$, pivoted at $g$ in the main frame of the apparatus or in any other suitable support, the opposite end of the lever $f$ being counterbalanced by a weight $i$, as shown in Figs. 1 and 2.

The descent of the cores $h$ is limited, and the range of movement of lever $f$ is consequently determined by blocks $j$, of wood or other suitable material, placed within the central openings of the solenoid-coils. It is deemed advisable to guide the counter-balance $i$ in its movements, and for this purpose a guiding-stem is provided, as shown by dotted lines in Fig. 2.

The lever $f$ extends between the lower ends of the arms $b$ of the brake B and is provided with beveled lugs or inclines $k$, which, when the cores $h$ are drawn into the solenoid coils, descend and pass between the lower ends of the arms $b$, and, bearing against them or against anti-friction rollers $l$ mounted therein, force the arms apart against the pressure or resistance of the spring $e$ and relieve the hub $a$ of friction, thereby leaving the spindle A, and consequently the armature of the motor, free to turn.

When the cores $h$ rise or move outward from the coils, the inclines $k$ ride off and clear of the rollers $l\ l$ and permit the arms B to be thrown inward, and to clasp and bind the hub $a$, as above explained.

The solenoid-coils are advisably included in the circuit in which the motor is placed; but they may be in a shunt or a circuit derived from the main circuit, though the former arrangement is preferred. This is illustrated in Fig. 4, in which the motor and the solenoid are represented as arranged in series in the main or working circuit which supplies the motor, said circuit being represented as a shunt or a derived circuit taken from the leading-wires of the generator. This is a common arrangement of electric motors; but it is obvious that the leading-wires of the generator may themselves be arranged to constitute the working-circuit, if desired.

F indicates a switch or circuit closer by which the working-circuit of the motor may be completed or interrupted at will.

Ordinarily a rheostat will be introduced into the working-circuit in connection with the switch or circuit closer, so that the current may be gradually thrown into the motor; but this is not essential.

The arbor or shaft A is extended beyond the hub or disk $a$ to connect with the hoisting machinery, and at a convenient point upon said shaft or arbor is applied the manual or mechanical brake C or C'.

In Fig. 2 the brake is represented as consisting of a band or strap $m$, encircling a hub or disk $n$, and having its ends pin-jointed to a lever G, by which the band or strap may be contracted and caused to bind with whatever degree of pressure may be necessary upon the hub or disk. The strap or band will be connected in any convenient manner with the frame-work of the machine or with any other fixed support.

In Fig. 2 a pin which connects the end of the lever and the end of the strap is represented as constituting a support for the brake-strap and a center of motion for the lever.

It is manifest that instead of the strap a simple brake shoe or lever adapted to be forced directly against the disk $n$ may be employed or that any other common and well-known form of brake may be substituted, as indicated in the drawings.

The apparatus being constructed as above described, its operation is as follows: The circuit is completed through the adjustment of circuit-closer F, and the arbor or spindle A begins to rotate, the commutator-brushes or other means for controlling the direction of rotation being set to produce the desired effect. Completion of the circuit causes the coils E to be energized instantly and the cores $h$ to be drawn into the coils, thereby lowering the forward arm of lever $f$ and carrying the inclines $k$ between the rollers $l$. The inclines bearing against and forcing back the rollers cause the arms $b\,b$ to be thrown apart against the pressure of the spring $e$, thus relieving the disk $a$ of pressure and leaving the arbor A, and consequently the armature of the motor, free to rotate. This action takes place the instant the circuit is completed, and consequently the armature is freed the moment the motor is supplied with current. So long as the current continues of sufficient force to propel the motor the coils E will be of sufficient strength to hold the brake B out of action; but if from any cause the current is interrupted the coils will be de-energized and the cores will be released, permitting the lever $f$ to be raised at its forward end by the action of the counter-weight $i$ at its rear end. In thus rising the lever $f$ carries the inclines or wedge-blocks $k$ from between the arms of the brake B and permits the spring $e$ to instantly apply the brake with its full power to the disk $a$, thereby bringing the armature promptly to rest and preventing that overrunning which would otherwise occur, and which in many instances would be disastrous—as, for instance, in the handling of pots or vessels containing molten metal and in like situations. In thus operating to hoist the load the motor is of course resisted in its action by the weight of the load, which exerts a constant tendency to turn the motor backward. If, therefore, it be desired to lower the load and for that purpose the motor be reversed, the circuit being completed, and the magnetic brake being consequently withdrawn or thrown off, the motor will turn backward at a speed proportionate to the weight of the load and the current supplied to the motor. Even if supplied with a very light current the backward rotation will shortly become very rapid, and the motor will race to such an extent as to develop a counter electro-motive force, which will neutralize the current and permit the brake to be again applied. This action will be repeated a greater or less number of times, according to the distance the load has to be lowered, the intermediate gearing employed, and like considerations, provided no other means be provided for controlling the descent of the load. It is during this part of the operation that the mechanical or manual brake comes into play—that is to say, when the motor is reversed. When the magnetic brake is thrown off or out of action, and when the load is descending, it is necessary to make use of the manual or mechanical brake.

With the mechanical or manual brake the motor may be started backward to lower the load at any speed desired, the control afforded by such brake enabling the operator, or serving automatically, as the case may be, to regulate the descent with the utmost nicety.

I am aware that magnetic brakes are not broadly new, and that such a brake has been arranged in series with the motor the action of which it was designed to control, and I therefore make no broad claim to this feature; but I am not aware that any one has ever before combined or proposed to combine with an electric motor two brakes, one electrically controlled and the other controlled independently of the electric current, so that the armature of the motor should be automatically and promptly brought to a standstill, and so, also, that the speed of the motor might be controlled when the magnetic brake should be out of action. In hoisting machinery particularly, and in some other connections also, this combination is of great importance and benefit, and this I mean to claim broadly and regardless of the precise arrangement of parts or construction of details, those illustrated in the drawings being merely given as a type and for purposes of explanation, subject to modification at the will and discretion of the builder.

It is obvious that a single core $h$ may be used instead of the two cores shown; but I prefer the latter construction.

Having thus described my invention, what I claim is—

1. In combination with an electric motor, an electric brake and a mechanical brake independent of the electrical brake, both adapted and arranged to control the operation of the motor, substantially as and for the purpose set forth.

2. In combination with hoisting machinery and with an electric motor for operating or controlling the same, an electric brake included in the circuit which supplies the motor, and a mechanical brake capable of operation independently of the electric brake, substantially as and for the purpose set forth.

3. In combination with a reversible electric motor, a magnetic brake and a mechanical brake adapted to control the descent of the load when the magnetic brake is thrown off or out of action.

4. In combination with the shaft or arbor of an electric motor, a disk $a$, secured thereon, pivoted arms $b$, adapted to bear upon the disk $a$ and to bind the same, a spring $e$, serving to force and hold the arms against the disk, a lever $f$, provided with inclines to work between and force apart said arms, coil E, connected with the source of supply of said motor, and core $h$, carried by the lever and working within the coil, substantially as and for the purpose set forth.

In witness whereof I hereunto set my hand in the presence of two witnesses.

ALTON J. SHAW.

Witnesses:
  A. A. L. SMITH,
  JOHN HURLEY.